United States Patent
Tashiro et al.

(10) Patent No.: US 11,427,142 B2
(45) Date of Patent: Aug. 30, 2022

(54) ELECTRICAL CONNECTION BOX WITH BONDER CAP AND SHALLOW/DEEP BOTTOM PARTS, AND WIRE HARNESS INCLUDING SAME

(71) Applicant: Yazaki Corporation, Tokyo (JP)

(72) Inventors: Hiroki Tashiro, Shizuoka (JP); Ryouichi Yokoyama, Shizuoka (JP); Atsushi Sumida, Shizuoka (JP); Junya Masuda, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 97 days.

(21) Appl. No.: 16/953,148

(22) Filed: Nov. 19, 2020

(65) Prior Publication Data
US 2021/0155178 A1    May 27, 2021

(30) Foreign Application Priority Data
Nov. 27, 2019    (JP) .............................. JP2019-213896

(51) Int. Cl.
*B60R 16/023*    (2006.01)
*B60R 16/02*    (2006.01)
*H02G 3/08*    (2006.01)

(52) U.S. Cl.
CPC ...... *B60R 16/0239* (2013.01); *B60R 16/0207* (2013.01); *H02G 3/081* (2013.01)

(58) Field of Classification Search
None
See application file for complete search history.

(56) References Cited

U.S. PATENT DOCUMENTS

| | | | | |
|---|---|---|---|---|
| 4,737,600 A | * | 4/1988 | Mathis | G02B 6/4476 |
| | | | | 174/91 |
| 7,074,077 B2 | * | 7/2006 | Sakaguchi | H01R 4/70 |
| | | | | 174/76 |
| 7,304,242 B1 | * | 12/2007 | Dower | H02G 15/1833 |
| | | | | 174/77 R |
| 7,351,123 B1 | * | 4/2008 | Winiecke | H01R 4/183 |
| | | | | 439/883 |

(Continued)

FOREIGN PATENT DOCUMENTS

| | | | |
|---|---|---|---|
| CN | 2190827 Y | * | 3/1995 |
| CN | 2190828 Y | * | 3/1995 |

(Continued)

*Primary Examiner* — Timothy J. Dole
*Assistant Examiner* — Muhammed Azam
(74) *Attorney, Agent, or Firm* — Kenealy Vaidya LLP

(57) ABSTRACT

An electrical connection box can include a housing and a lower cover that closes a lower part of the housing in which the housing includes an electric wire bundle holder whose lower side open so as to be able to allow insertion of a bonder cap of an electric wire bundle in a state where the electric wire bundle is covered with the bonder cap. The lower cover includes a deep bottom part having a drainage hole. A shallow bottom part can be located above the deep bottom part below the electric wire bundle holder, with the shallow bottom part being formed to include an inclined surface inclined downward toward the deep bottom part, and a state where the bonder cap is inserted into the electric wire bundle holder is maintained on the inclined surface of the shallow bottom part on the lower cover.

9 Claims, 6 Drawing Sheets

(56) References Cited

U.S. PATENT DOCUMENTS

| | | | | |
|---|---|---|---|---|
| 7,834,268 B2* | 11/2010 | Ootsuki | | H01R 43/005 |
| | | | | 174/74 A |
| 7,955,108 B2* | 6/2011 | Jonli | | H05B 3/06 |
| | | | | 174/74 A |
| 9,203,224 B2* | 12/2015 | Yamamoto | | H01R 4/22 |
| 10,819,045 B2* | 10/2020 | Tomita | | H01R 4/22 |
| 2004/0104039 A1* | 6/2004 | Herbert, Jr. | | H01R 4/12 |
| | | | | 174/87 |
| 2004/0253857 A1* | 12/2004 | Sakaguchi | | H01R 4/20 |
| | | | | 439/134 |
| 2005/0194167 A1* | 9/2005 | Kiyota | | H02G 3/081 |
| | | | | 174/17 VA |
| 2009/0221160 A1* | 9/2009 | Taniguchi | | H02G 3/083 |
| | | | | 439/76.2 |
| 2010/0279529 A1* | 11/2010 | Ng Vern Shen | | H01R 13/5812 |
| | | | | 439/153 |
| 2010/0307814 A1* | 12/2010 | Aoki | | H02G 3/088 |
| | | | | 174/520 |
| 2011/0290802 A1* | 12/2011 | Burros | | H02G 3/081 |
| | | | | 220/327 |
| 2012/0222880 A1* | 9/2012 | Dinh | | H02G 3/14 |
| | | | | 174/50 |
| 2013/0032371 A1* | 2/2013 | Makino | | H05K 7/026 |
| | | | | 174/50 |
| 2013/0269970 A1* | 10/2013 | Hara | | H02G 3/04 |
| | | | | 174/101 |
| 2014/0311793 A1* | 10/2014 | Kaneko | | H02G 3/081 |
| | | | | 174/560 |
| 2014/0312031 A1* | 10/2014 | Kaneko | | B60R 16/0238 |
| | | | | 220/3.8 |
| 2015/0101839 A1* | 4/2015 | Shiraki | | H02G 3/081 |
| | | | | 174/50 |
| 2015/0171608 A1* | 6/2015 | Ueyama | | H05K 5/0004 |
| | | | | 174/50 |
| 2015/0236489 A1* | 8/2015 | Yamamoto | | H02G 3/16 |
| | | | | 174/520 |
| 2015/0359112 A1* | 12/2015 | Nakashima | | H05K 5/0247 |
| | | | | 174/560 |
| 2016/0345455 A1* | 11/2016 | Maebashi | | H02G 3/088 |
| 2017/0063069 A1* | 3/2017 | Kawada | | H01B 7/0045 |
| 2017/0070040 A1* | 3/2017 | Kawada | | B60R 16/0238 |
| 2017/0163016 A1* | 6/2017 | Okada | | H02G 3/088 |
| 2017/0169919 A1* | 6/2017 | Wakabayashi | | B60R 16/0207 |
| 2017/0201079 A1* | 7/2017 | Shiraki | | B60R 16/0238 |
| 2017/0207614 A1* | 7/2017 | Shiraki | | B60R 16/0238 |
| 2018/0309278 A1* | 10/2018 | Ikeda | | H02G 3/18 |
| 2018/0309279 A1* | 10/2018 | Kakimi | | H02G 3/086 |
| 2018/0312122 A1* | 11/2018 | Kakimi | | B60R 16/0207 |
| 2018/0342859 A1* | 11/2018 | Kiyota | | B60R 16/0239 |
| 2019/0348825 A1* | 11/2019 | Ikeda | | B60R 16/0238 |
| 2019/0376542 A1* | 12/2019 | Kawamura | | H05K 7/026 |
| 2020/0153213 A1* | 5/2020 | Kakimi | | H02G 3/081 |
| 2020/0176894 A1* | 6/2020 | Tomita | | H01R 4/22 |
| 2020/0295549 A1* | 9/2020 | Kurata | | H02G 3/088 |
| 2020/0295550 A1* | 9/2020 | Kurata | | H02G 3/088 |
| 2020/0295551 A1* | 9/2020 | Kurata | | B60R 16/0238 |
| 2020/0295552 A1* | 9/2020 | Kurata | | H02G 3/16 |
| 2021/0104880 A1* | 4/2021 | Kurata | | H02G 3/081 |
| 2021/0155178 A1* | 5/2021 | Tashiro | | B60R 16/0238 |

FOREIGN PATENT DOCUMENTS

| | | | | |
|---|---|---|---|---|
| CN | 1873290 A | * | 12/2006 | |
| CN | 101183772 A | * | 5/2008 | ......... B60R 16/0238 |
| CN | 105034976 A | * | 11/2015 | ......... B60R 16/0238 |
| CN | 106486941 B | * | 10/2019 | ......... B60R 16/0238 |
| CN | 112615318 A | * | 4/2021 | ......... B60R 16/0238 |
| EP | 0381024 A2 | * | 1/1990 | |
| JP | H0436489 Y2 | * | 8/1992 | |
| JP | H08140244 A | * | 5/1996 | |
| JP | 10-304537 A | | 11/1998 | |
| JP | 2014-42388 A | | 11/1998 | |
| JP | 5067199 B2 | | 11/2012 | |
| JP | 2014-220894 A | | 11/2014 | |
| JP | 2014-220895 A | | 11/2014 | |
| JP | 2015204717 A | * | 11/2015 | |
| JP | 5896416 B2 | | 3/2016 | |
| WO | WO-9954901 A1 | * | 10/1999 | ......... B60R 16/0239 |
| WO | WO-2009005521 A1 | * | 1/2009 | ......... H01H 85/0417 |
| WO | WO-2014017526 A1 | * | 1/2014 | ......... B60R 16/0238 |
| WO | WO-2014030660 A1 | * | 2/2014 | ............... H01R 4/22 |

\* cited by examiner

ELECTRICAL CONNECTION BOX WITH BONDER CAP AND SHALLOW/DEEP BOTTOM PARTS, AND WIRE HARNESS INCLUDING SAME

CROSS-REFERENCE TO RELATED APPLICATION(S)

The present application claims priority to and incorporates by reference the entire contents of Japanese Patent Application No. 2019-213896 filed in Japan on Nov. 27, 2019.

BACKGROUND OF THE INVENTION

1. Field of the Invention

The present invention relates to an electrical connection box and a wire harness.

2. Description of the Related Art

Some of the electric wires arranged in an electrical connection box mounted on a vehicle such as an automobile are provided as a plurality of electric wires having their conductors at the ends electrically connected to each other, with a protective cap referred to as a bonder cap attached to the connected part. For example, Japanese Patent No. 3334099 and Japanese Patent No. 5896416 describe a structure in which a bonder cap is attached to an end of each of a plurality of conductor cables having conductors electrically connected, and the bonder cap is accommodated in an electrical connection box.

In recent years, with an increase of the number of electronic components mounted in the electrical connection box, the number of electric wires arranged in the electrical connection box is also increasing. This leads to a concern of enlargement of the electrical connection box. Here, regarding the accommodation of the bonder cap, an exemplary technology in Japanese Patent No. 3334099 uses a pair of bonder caps coupled at a coupling portion, and an accommodating portion is provided with a regulator that engages with the coupling portion to regulate the movement of the bonder cap. This leads to a complicated structure, making it difficult to contribute to miniaturization. As another example to accommodate the bonder cap, the technology described in Japanese Patent No. 5896416 uses a configuration in which the electric wire bundle covered with the bonder cap is supported with a covering in a state where the covering is attached to a frame so as to prevent the bonder cap from falling from the accommodating portion of the frame, with no effects of contributing to miniaturization.

SUMMARY OF THE INVENTION

The present invention has been made in view of the above circumstances, and aims to provide an electrical connection box and a wire harness capable of efficiently accommodating an electric wire bundle covered with a bonder cap.

In order to achieve the above mentioned object, an electrical connection box according to one aspect of the present invention includes a housing that houses electronic components; and a lower cover that closes a lower part of the housing, wherein the housing includes an electric wire bundle holder whose lower side open so as to be able to allow insertion of a bonder cap of an electric wire bundle in which conductors of a plurality of electric wires are connected to each other in a state where the electric wire bundle is covered with the bonder cap, the lower cover includes a deep bottom part having a drainage hole; and a shallow bottom part located above the deep bottom part below the electric wire bundle holder, with the shallow bottom part being formed to include an inclined surface inclined downward toward the deep bottom part, and a state where the bonder cap is inserted into the electric wire bundle holder is maintained on the inclined surface of the shallow bottom part on the lower cover.

According to another aspect of the present invention, in the electrical connection box, it is possible to configure that a portion of the shallow bottom part that is arranged below the electric wire bundle holder comes at an uppermost position on the lower cover.

According to still another aspect of the present invention, in the electrical connection box, it is possible to configure that the electric wire bundle holder has a partition wall that partitions a single or a plurality of bonder caps to enable accommodation.

According to still another aspect of the present invention, in the electrical connection box, it is possible to configure that the electric wire bundle holder is provided along a side wall around the housing.

In order to achieve the above mentioned object, a wire harness according to still another aspect of the present invention includes a wiring member having conductivity; and an electrical connection box connected to the wiring member, wherein the electrical connection box includes: a housing that houses electronic components electrically connected with the wiring member; and a lower cover that closes a lower part of the housing, the housing includes an electric wire bundle holder whose lower side open so as to be able to allow insertion of a bonder cap of an electric wire bundle in which conductors of a plurality of electric wires are connected to each other in a state where the electric wire bundle is covered with the bonder cap, the lower cover includes a deep bottom part having a drainage hole; and a shallow bottom part located above the deep bottom part below the electric wire bundle holder, with the shallow bottom part being formed to include an inclined surface inclined downward toward the deep bottom part, and a state where the bonder cap is inserted into the electric wire bundle holder is maintained on the inclined surface of the shallow bottom part on the lower cover.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
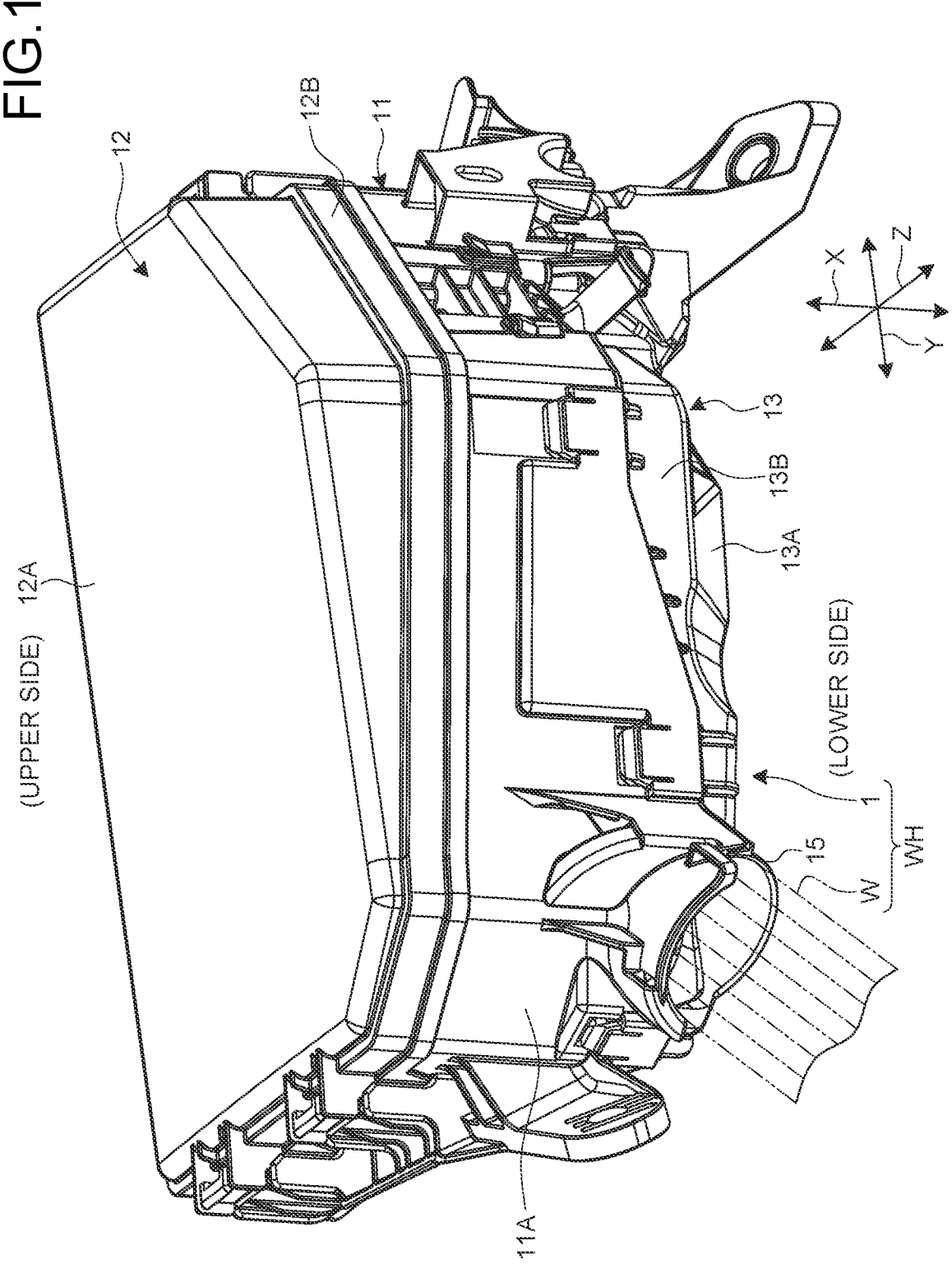
FIG. 1 is a perspective view of an electrical connection box according to an embodiment.

Embodiments according to the present invention will be described below in detail with reference to the drawings. Note that the present invention is not limited by the present embodiment. Moreover, components in the following embodiment include those easily interchangeable by those skilled in the art or substantially identical.

In the following description, three directions intersecting each other are referred to as an "up-down direction X", a "first width direction Y", and a "second width direction Z" for convenience. Here, the up-down direction X, the first width direction Y, and the second width direction Z are orthogonal to each other. Typically, the up-down direction X corresponds to a vertical direction, and the upper vertical part is referred to as an upper part or an upper side, and the lower vertical part is referred to as a lower part or a lower side. Moreover, typically, the first width direction Y and the second width direction Z correspond to a horizontal direction, the first width direction Y corresponds to a long side direction in an electrical connection box 1, and the second width direction Z corresponds to a short side direction in the electrical connection box 1. Unless otherwise specified, individual directions used in the following description will be described as directions in a state where the electrical connection box 1 is mounted on a vehicle.

EMBODIMENT

The electrical connection box 1 according to the present embodiment is mounted on a vehicle such as an automobile and incorporated in a wire harness WH. The wire harness WH is formed as a component assembly obtained by bundling a plurality of wiring members W used for power supply and signal communication to achieve connection between devices mounted on a vehicle, with the plurality of wiring members W connected to each of the devices via connectors or the like. The wire harness WH includes a wiring member W having conductivity and an electrical connection box 1 that is electrically connected to the wiring member W. The wiring member W is formed with a metal rod, an electric wire, an electric wire bundle, or the like. The metal rod is a rod-shaped member having conductivity, outside of which being covered with an insulating coating. The electric wire is a conductor (core wire) formed of a plurality of metal wires having conductivity, outside of the conductor being covered with insulating coating. The wire harness WH bundles and aggregates a plurality of wiring members W so as to electrically connect the electrical connection box 1 via a connector or the like provided at a terminal of the bundled wiring members W. The wire harness WH may also include a grommet, a protector, a fixture, and the like.

The electrical connection box 1 is used to integrate and internally accommodate electronic components 2 such as a connector, a fuse, a relay, a capacitor, a branch member, an electronic control unit, and an electronic component unit incorporating these as a unit. The electrical connection box 1 is installed, for example, in an engine compartment or inside the vehicle compartment. The electrical connection box 1 is connected between a power source such as a battery and various electronic devices mounted in the vehicle, via a wiring member W or the like. The electrical connection box 1 distributes the electric power supplied from the power source to various electronic devices in the vehicle. The electrical connection box 1 may also be referred to as a junction box, a fuse box, a relay box, or the like. In the present embodiment, however, these are collectively referred to as an electrical connection box.

Figure 2:
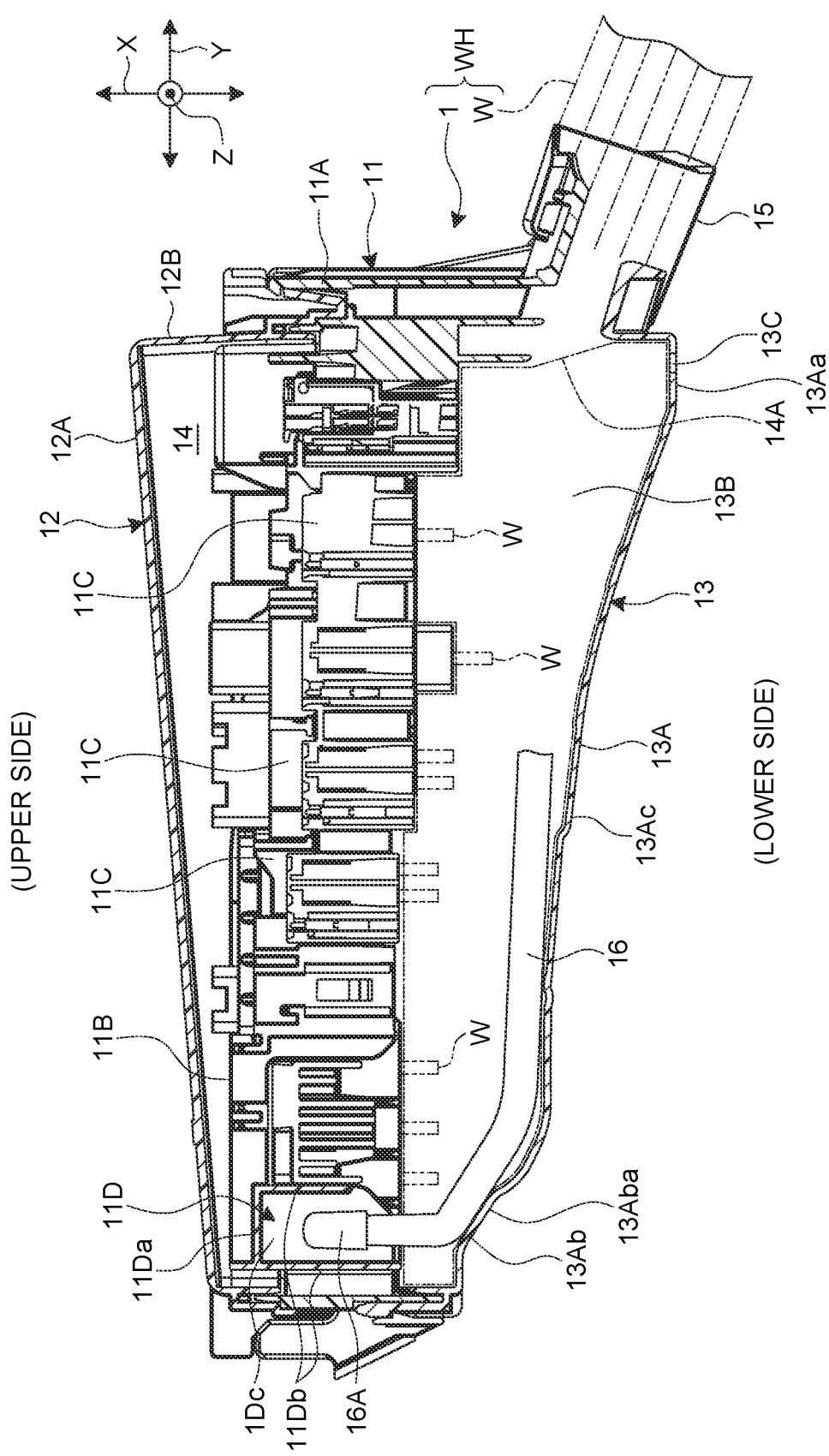
FIG. 2 is a cross-sectional view of an electrical connection box according to an embodiment.

Specifically, as illustrated in FIGS. 1 and 2, the electrical connection box 1 includes a housing 11, an upper cover 12 attached to an upper part of the housing 11, and a lower cover 13 attached to a lower part of the housing 11. By combining the housing 11 with the upper cover 12 and the lower cover 13, the electrical connection box 1 is formed in a hollow box shape as a whole. The electrical connection box 1 has a three-layer structure in which the housing 11, the upper cover 12, and the lower cover 13 are divided into each other in the up-down direction X. The electrical connection box 1 has a configuration in which the housing 11, the upper cover 12, and the lower cover 13 are stacked and mutually assembled in the up-down direction X, inside of which an accommodation space 14 is formed. The housing 11, the upper cover 12, and the lower cover 13 are formed of an insulating synthetic resin.

Figure 3:
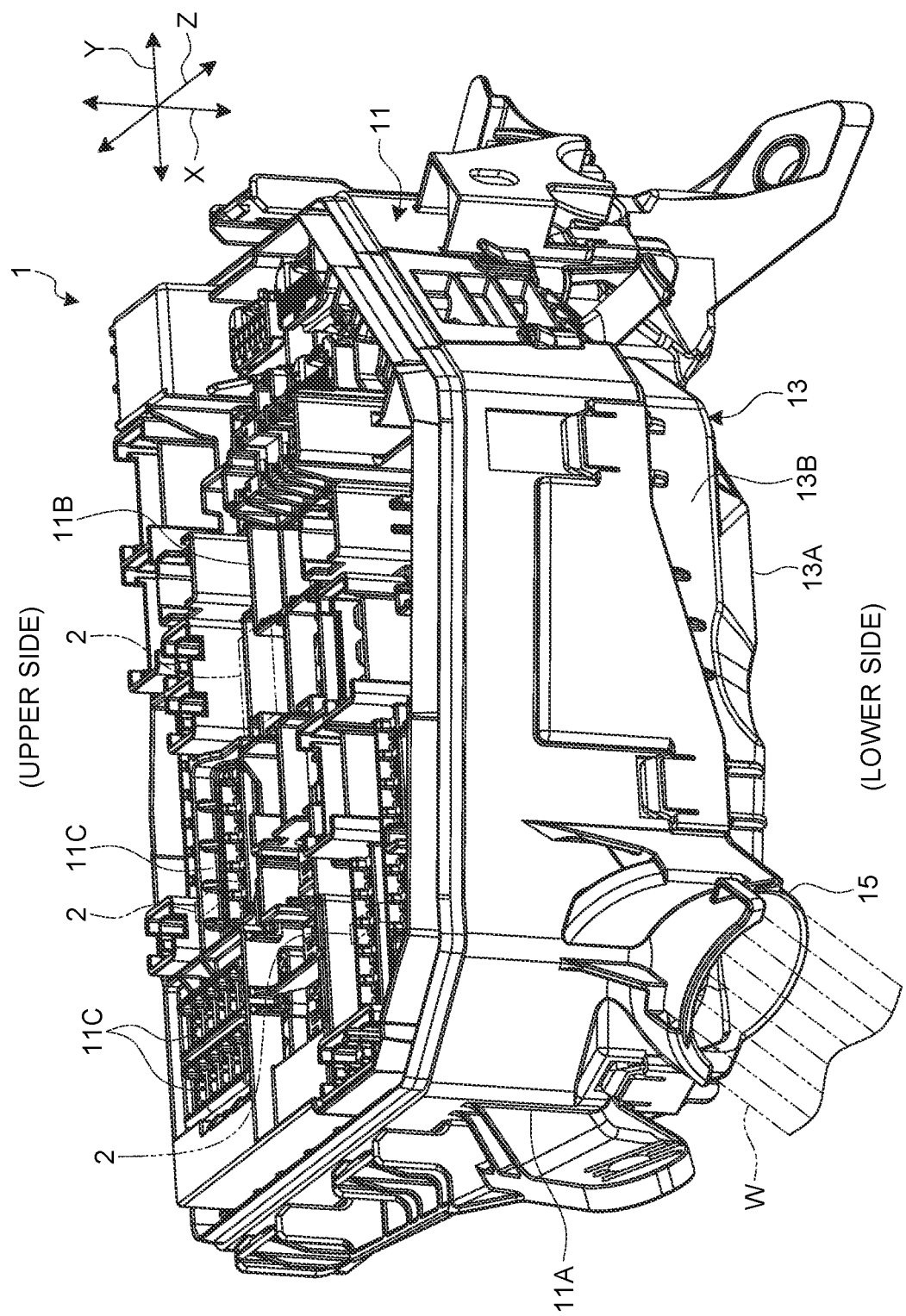
FIG. 3 is a perspective view of an electrical connection box according to an embodiment with an upper cover removed.
Figure 4:
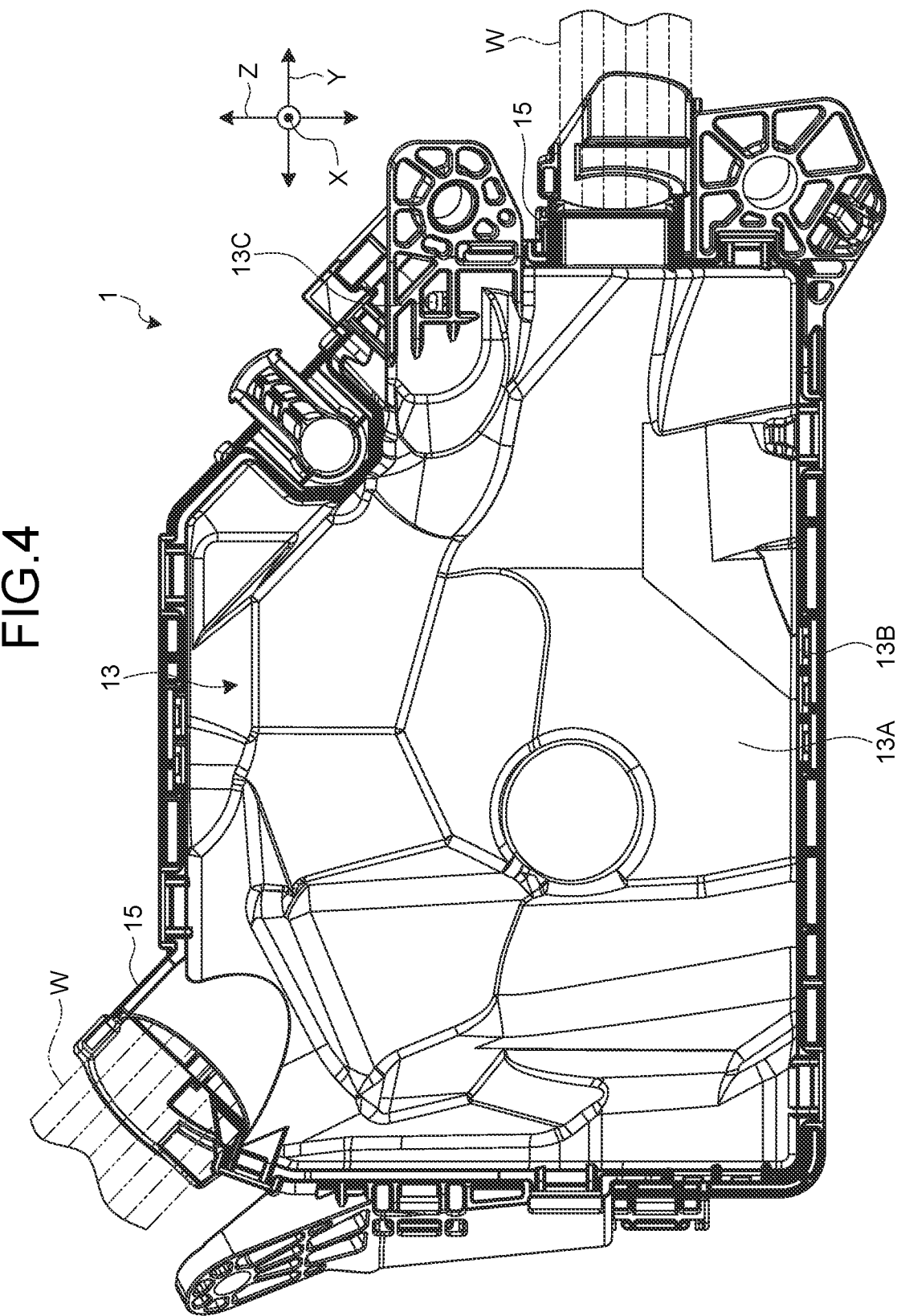
FIG. 4 is a bottom view of an electrical connection box according to an embodiment.

The housing 11 constitutes the main body of the electrical connection box 1, and is also referred to as a frame. The housing 11 has an opening on the upper side and the lower side in the up-down direction X, with an entire circumference including the first width direction Y and the second width direction Z being surrounded by a side wall 11A so as to be formed in a polygonal tubular shape (substantially rectangular tubular shape). Internal portions of the tubular-shaped housing 11 form a part of the accommodation space 14. As illustrated in FIG. 3, inside the tubular-shaped housing 11, there is provided a frame 11B that is divided into a plurality of portions in the first width direction Y and the second width direction Z and is formed to penetrate in the up-down direction X. The frame 11B is formed of an insulating synthetic resin similarly to the housing 11, integrally with or separately from the housing 11. The frame 11B is individually divided into a plurality of sections, to each of which a block 11C is detachably assembled. The block 11C is assembled onto the frame 11B penetrating in the up-down direction X, and appears on the upper side and the lower side. Formed of an insulating synthetic resin similarly to the housing 11, the block 11C has a cavity that runs along the shape of various electronic components 2 (part of which is illustrated by a double-dashed chain line in FIG. 3). Electronic components 2 are assembled in this cavity. Furthermore, a circuit body formed of a conductive metal material is assembled to the block 11C. The circuit body electrically connects each of the electronic components 2 assembled in each of cavities to form a part of an electric circuit. An example of the circuit body is a bus bar. The electronic component 2 is assembled to the block 11C from an upper side in the up-down direction X. Furthermore, as illustrated in FIG. 2, the block 11C is provided with a connecting terminal or the like attached at the terminal of the wiring member W so as to be electrically connected to the assembled electronic component 2. The connecting terminal of the wiring member W is inserted into and fitted to the block 11C from the lower side of the up-down direction X. With this configuration, each of the electronic components 2 and each of the wiring members W are electrically connected to each other via a circuit body such as a bus bar in a state of being assembled and mounted on the block 11C so as to form an electric circuit as required. The frame 11B and the block 11C are also referred to as electronic component mounting brackets for assembling and supporting the electronic component 2.

Figure 5:
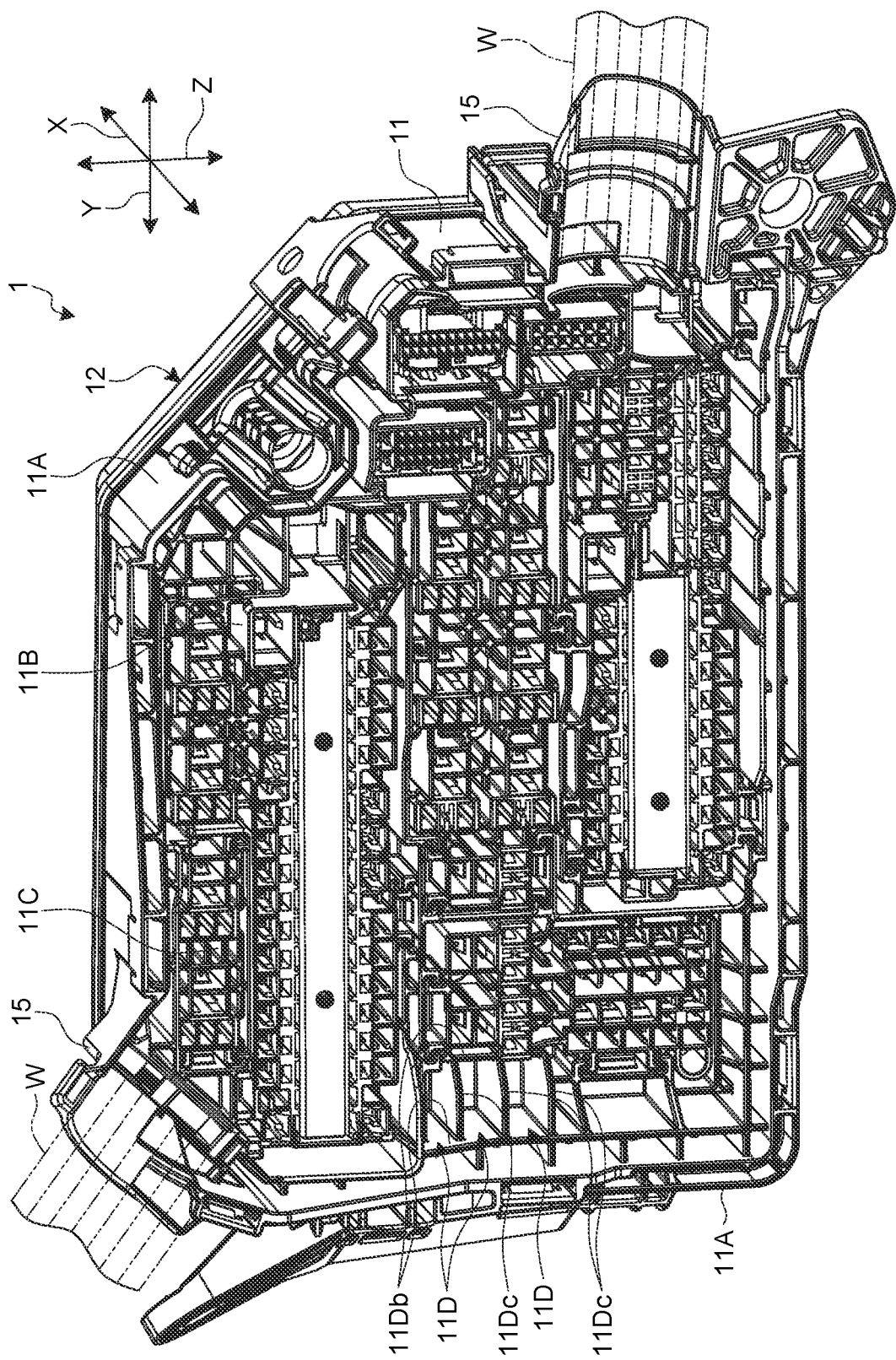
FIG. 5 is a bottom perspective view of an electrical connection box according to an embodiment with a lower cover removed.
Figure 6:
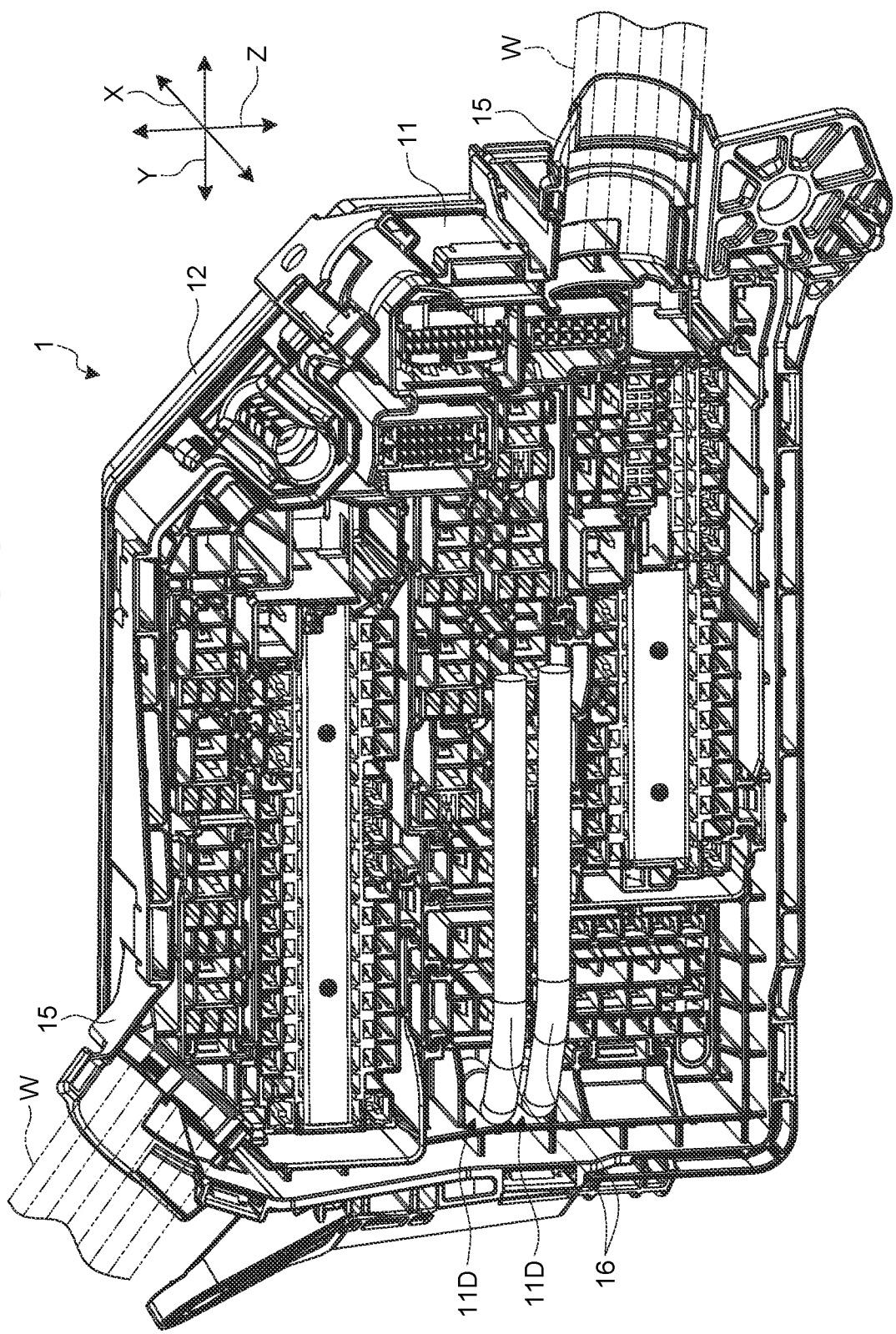
FIG. 6 is a bottom perspective view of an electrical connection box according to an embodiment with the lower cover removed and the electric wire bundle inserted in the electric wire bundle holder.

Furthermore, as illustrated in FIGS. 2, 5 and 6, the housing 11 is provided with an electric wire bundle holder 11D in a part of the frame 11B. In the frame 11B, the electric wire bundle holder 11D includes a ceiling 11Da that closes an upper side in the up-down direction X, a pair of peripheral walls 11Db closing both sides in the first width direction Y, and a plurality of partition walls 11Dc that divide between individual peripheral walls 11Db into a plurality of spaces in the second width direction Z. Accordingly, the electric wire bundle holder 11D has a configuration in which the upper side in the up-down direction X is closed by the ceiling 11Da with the lower side opened, the first width direction Y is partitioned by the peripheral wall 11Db, and the second width direction Z is divided into a plurality of spaces with the partition wall 11Dc. Alternatively, the electric wire bundle holder 11D may also have a configuration in which the upper side in the up-down direction X closed by the ceiling 11Da with the lower side opened, the second width direction Z is partitioned by the peripheral wall 11Db, and the first width direction Y is divided into a plurality of spaces with the partition wall 11Dc. Furthermore, the electric wire bundle holder 11D is provided along an inner surface of the side wall 11A of the housing 11, and is provided at the portion closest to the side wall 11A in the frame 11B. an electric wire bundle 16 is inserted and housed in the electric wire bundle holder 11D. The electric wire bundle 16 is obtained by electrically connecting the conductors to each other at the ends of a plurality of electric wires and covering the connecting portions of the conductors at the ends with a bonder cap 16A formed of an insulating member. The bonder cap 16A is bonded to the connecting portion of the conductor portion by thermal welding, for example. The portion of the bonder cap 16A at the end is inserted from the lower side of the electric wire bundle holder 11D in the up-down direction X to allow the electric wire bundle 16 to be held in the electric wire bundle holder 11D. A single or a plurality of bonder caps 16A can be inserted to and held by the electric wire bundle holder 11D.

The upper cover 12 is a lid-shaped member that closes the upper opening being the upper part of the housing 11. The upper cover 12 includes a ceiling plate 12A provided in the first width direction Y and the second width direction Z, and a side wall 12B extending downward from a peripheral edge of the ceiling plate 12A. The side wall 12B overlaps the side wall 11A of the housing 11 in the first width direction Y and the second width direction Z, fits into the housing 11, and is assembled via various locking mechanisms. The ceiling plate 12A closes the opening on the upper side of the housing 11 in a state where the side wall 12B is fitted to the housing 11. Accordingly, the upper cover 12 is provided so that the inner sides of the ceiling plate 12A and the side wall 12B constitute a part of the accommodation space 14.

The lower cover 13 is a lid-shaped member that closes the lower opening being a lower part of the housing 11. The lower cover 13 includes a bottom plate 13A provided in the first width direction Y and the second width direction Z, and a side wall 13B extending upward from a peripheral edge of the bottom plate 13A. Overlaid with the side wall 11A of the housing 11 in the first width direction Y and the second width direction Z, the side wall 13B is fitted to and assembled onto the housing 11 via various locking mechanisms. The bottom plate 13A closes the opening on the lower side of the housing 11 in a state where the side wall 13B is fitted to the housing 11. Accordingly, the lower cover 13 is provided so that the inner sides of the bottom plate 13A and the side wall 13B constitute a part of the accommodation space 14. A part of the accommodation space 14 formed by the lower cover 13 is provided under the frame 11B of the housing 11 so as to be configured as an electric wire accommodation space 14A. The electric wire accommodation space 14A is a space accommodating the wiring member W including the electric wire bundle 16.

Furthermore, as illustrated in FIG. 2, the lower cover 13 has a deep bottom part 13Aa, a shallow bottom part 13Ab, and an inclined portion 13Ac, included in the bottom plate 13A. The deep bottom part 13Aa is a portion of the bottom plate 13A located on the lower side. The deep bottom part 13Aa is located at the lowermost position on the bottom plate 13A. The deep bottom part 13Aa has a drainage hole 13C. The drainage hole 13C penetrates through the inner and outer sides of the accommodation space 14 (electric wire accommodation space 14A) on the lower cover 13. The shallow bottom part 13Ab is a portion that is above the deep bottom part 13Aa and is located on the upper side. The shallow bottom part 13Ab is located at the uppermost position of the bottom plate 13A. The shallow bottom part 13Ab is formed with an inclined surface 13Aba inclined downward toward the deep bottom part 13Aa on its inner surface. The inclined portion 13Ac is a portion forming an inclined surface between the shallow bottom part 13Ab and the deep bottom part 13Aa, and is formed so as to be inclined downward from the shallow bottom part 13Ab toward the deep bottom part 13Aa. Accordingly, when water enters the accommodation space 14 of the electrical connection box 1, the lower cover 13 sends the water to the deep bottom part 13Aa through the inclined surface 13Aba of the shallow bottom part 13Ab, and the inclined portion 13Ac. The water sent to the deep bottom part 13Aa is discharged to the outside of the accommodation space 14 (electric wire accommodation space 14A) through the drainage hole 13C.

In the lower cover 13, the shallow bottom part 13Ab of the bottom plate 13A is located below the electric wire bundle holder 11D as illustrated in FIG. 2. Specifically, the shallow bottom part 13Ab is provided so that the inclined surface 13Aba is located below the electric wire bundle holder 11D. The inclined surface 13Aba, which is an inclined portion of the shallow bottom part 13Ab, comes into contact with the electric wire bundle 16 with the portion of the bonder cap 16A held in the electric wire bundle holder 11D in a state where the lower cover 13 is assembled to the housing 11. With this configuration, the electrical connection box 1 uses the inclined surface 13Aba of the shallow bottom part 13Ab to prevent the bonder cap 16A of the electric wire bundle 16 from detaching and falling from the electric wire bundle holder 11D.

Furthermore, in the electric wire accommodation space 14A formed by the lower cover 13, the width in the up-down direction X is small at the position of the shallow bottom part 13Ab, whereas the width in the up-down direction X gradually increases from the shallow bottom part 13Ab toward the deep bottom part 13Aa due to the inclined surface 13Aba and the inclined portion 13Ac. Therefore, the electrical connection box 1 contributes to miniaturization at the position of the shallow bottom part 13Ab, while ensuring an area for accommodating the wiring member W including the electric wire bundle 16 in the electric wire accommodation space 14A, as gradually approaching the deep bottom part 13Aa.

In mutually assembled states, the lower cover 13 and the housing 11 form a tubular insertion part 15 extending outward on the side walls 13B and 11A, respectively. The insertion part 15 is a part through which the wiring member W passes through the inner and outer sides of the accommodation space 14 of the electrical connection box 1. The insertion part 15 is formed at two locations in the electrical connection box 1 of the present embodiment.

Here, assembly of the electrical connection box 1 described above will be described. In the electrical connection box 1, the connecting terminal of the wiring member W is inserted into the block 11C to form a sub-harness. Subsequently, in the electrical connection box 1, the block 11C constituting the sub-harness is assembled to the frame 11B of the housing 11 from below. At this time, the lower side of the housing 11 is set to face upward, facilitating the work of attaching the block 11C. Furthermore, in the electrical connection box 1, the bonder cap 16A of the electric wire bundle 16 is inserted into the electric wire bundle holder 11D from above (lower side) with the lower side of the housing 11 facing upward. At this time, with the state in which the lower side of the housing 11 faces upward, it is possible to facilitate the work of inserting the bonder cap 16A into the electric wire bundle holder 11D, while enabling suppression of detachment of the inserted bonder cap 16A from the electric wire bundle holder 11D. The electric wire bundle holder 11D is narrowed because of partitioning between the peripheral walls 11Db by the partition wall 11Dc, and thus, it is possible to prevent detachment of the electric wire bundle 16 because the bonder cap 16A inserted to the narrowed portion is fitted. With this state of the electrical connection box 1, the lower cover 13 is assembled to the housing 11 so that the wiring member W including the electric wire bundle 16 fits inside the electric wire accommodation space 14A, and the wiring member W is inserted through the insertion part 15. At this time, the electrical connection box 1 is in a state where the bonder cap 16A is fitted in the electric wire bundle holder 11D, and thus the electric wire bundle 16 would not be caught between the housing 11 and the lower cover 13, suppressing hindrance to the work of assembling the lower cover 13 to the housing 11. This results in facilitation of the work in the electrical connection box 1 to attach the lower cover 13 to the housing 11. Thereafter, in a state where the upper side of the electrical connection box 1 faces upward, the electronic component 2 is assembled to the block 11C which is an electronic component mounting bracket, and the upper cover 12 is assembled to the housing 11. The work of assembling the electronic component 2 may be performed after the electrical connection box 1 is mounted on the vehicle. Furthermore, in a state where the upper side faces upward, the electrical connection box 1 uses the inclined surface 13Aba of the shallow bottom part 13Ab to prevent the bonder cap 16A of the electric wire bundle 16 from detaching and falling from the electric wire bundle holder 11D.

In this manner, the wire harness WH of the present embodiment includes: the wiring member W having conductivity; and the electrical connection box 1 of the present embodiment connected to the wiring member W. Furthermore, the electrical connection box 1 of the present embodiment includes: the housing 11 that accommodates the electronic component 2; and the lower cover 13 that closes the lower portion of the housing 11. In the electrical connection box 1 and the wire harness WH of the present embodiment, the housing 11 includes the electric wire bundle holder 11D whose lower side open so as to be able to allow insertion of the bonder cap 16A of the electric wire bundle 16 in which the conductors of a plurality of electric wires are connected to each other, covered with the bonder cap 16A. Furthermore, in the electrical connection box 1 and the wire harness WH of the present embodiment, the lower cover 13 includes the deep bottom part 13Aa having the drainage hole 13C; and the shallow bottom part 13Ab located above the deep bottom part 13Aa below the electric wire bundle holder 11D, and the shallow bottom part 13Ab is formed to include an inclined surface 13Aba inclined downward toward the deep bottom part 13Aa. In the electrical connection box 1 and the wire harness WH of the present embodiment, the state where the bonder cap 16A is inserted into the electric wire bundle holder 11D is maintained on the inclined surface 13Aba of the shallow bottom part 13Ab on the lower cover 13.

Accordingly, in the electrical connection box 1 and the wire harness WH, the portion of the lower cover 13 having the shallow bottom part 13Ab is located at an upper position in an inclined state in order to enhance drainage, resulting in forming a dead space having insufficient height and low accommodation efficiency of the wiring member W. However, the electrical connection box 1 and the wire harness WH have a configuration in which the electric wire bundle holder 11D is arranged above the shallow bottom part 13Ab of the lower cover 13, maintaining the state in which the bonder cap 16A is inserted into the electric wire bundle holder 11D using the inclined surface 13Aba. Therefore, it is possible to accommodate the electric wire bundle 16 in the dead space without a need to separately provide a structure to prevent the bonder cap 16A from falling from the electric wire bundle holder 11D. As a result, the electrical connection box 1 and the wire harness WH can efficiently accommodate the electric wire bundle 16 covered with the bonder cap 16A, making it possible to contribute to miniaturization.

Furthermore, in the electrical connection box 1 and the wire harness WH of the present embodiment, the portion of the shallow bottom part 13Ab that is arranged below the electric wire bundle holder 11D comes at the uppermost position on the lower cover 13.

Accordingly, since the electrical connection box 1 and the wire harness WH have a configuration in which the shallow bottom part 13Ab at the uppermost position in the lower cover 13 is located below the electric wire bundle holder 11D, it is possible to arrange the electric wire bundle 16 in a portion having a small height dimension while arranging other wires in other parts with large height dimensions. As a result, the electrical connection box 1 and the wire harness WH can efficiently accommodate other electric wires including the electric wire bundle 16.

Furthermore, in the electrical connection box 1 and the wire harness WH of the present embodiment, the electric wire bundle holder 11D has a partition wall 11Dc that partitions a single or a plurality of bonder caps 16A to enable accommodation.

Therefore, having a partition wall 11Dc that can accommodate a single or a plurality of bonder caps 16A in the electric wire bundle holder 11D, the electrical connection box 1 and the wire harness WH can improve rigidity to obtain better reinforcement effect.

Furthermore, in the electrical connection box 1 and the wire harness WH of the present embodiment, the electric wire bundle holder 11D is provided along the side wall 11A around the housing 11.

Accordingly, in the electrical connection box 1 and the wire harness WH, the electric wire bundle holder 11D is provided along the side wall 11A around the housing 11, and the shallow bottom part 13Ab is arranged below the electric wire bundle holder 11D. With this configuration, a dead space having low accommodation efficiency can be arranged around the housing 11 so as to accommodate the bonder cap 16A of the electric wire bundle 16, while the deep bottom part 13Aa having high accommodation efficiency can be arranged in the center of the housing 11.

In the above-described embodiment, the electric wire bundle holder 11D has a substantially rectangular shape when viewed in the up-down direction X. However, the electric wire bundle holder 11D may have a shape other than the rectangular shape. The shape of the electric wire bundle holder 11D may be preferably set as appropriate according to the shape of other parts inside the housing 11.

Furthermore, the electric wire bundle holder 11D in the above-described embodiment is provided at one location inside the housing 11, but may be provided at a plurality of locations inside the housing 11.

The part of the lower cover having a shallow bottom part is located at an upper position in an inclined state in order to enhance drainage, resulting in forming a dead space having insufficient height and low accommodation efficiency of electric wires. The electrical connection box and the wire harness according to the present embodiment has a configuration in which an electric wire bundle holder is arranged above the shallow bottom part of the lower cover, maintaining a state in which the bonder cap is inserted into the electric wire bundle holder using an inclined portion. Therefore, it is possible to accommodate the electric wire bundle in the dead space without a need to separately provide a structure to prevent the bonder cap from falling from the electric wire bundle holder. As a result, the electrical connection box and the wire harness according to the present embodiment can efficiently accommodate the electric wire bundle covered with the bonder cap, making it possible to contribute to miniaturization.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
   a housing that houses electronic components; and
   a lower cover that closes a lower part of the housing, wherein
   the housing includes an electric wire bundle holder whose lower side open so as to be able to allow insertion of at least one bonder cap of an electric wire bundle in which conductors of a plurality of electric wires are connected to each other in a state where the electric wire bundle is covered with the at least one bonder cap,
   the lower cover includes a deep bottom part having a drainage hole; and a shallow bottom part located above the deep bottom part below the electric wire bundle holder, the shallow bottom part being formed to include an inclined surface inclined downward toward the deep bottom part, and
   the inclined surface of the shallow bottom part on the lower cover abuts the electric wire bundle in a state where the at least one bonder cap is inserted into the electric wire bundle holder.

2. The electrical connection box according to claim 1, wherein
   a portion of the shallow bottom part that is arranged below the electric wire bundle holder comes at an uppermost position on the lower cover.

3. The electrical connection box according to claim 2, wherein
   the electric wire bundle holder has a partition wall that partitions the at least one bonder cap to enable accommodation.

4. The electrical connection box according to claim 3, wherein
   the electric wire bundle holder is provided along a side wall around the housing.

5. The electrical connection box according to claim 2, wherein
   the electric wire bundle holder is provided along a side wall around the housing.

6. The electrical connection box according to claim 1, wherein
   the electric wire bundle holder has a partition wall that partitions the at least one bonder cap to enable accommodation.

7. The electrical connection box according to claim 6, wherein
   the electric wire bundle holder is provided along a side wall around the housing.

8. The electrical connection box according to claim 1, wherein
   the electric wire bundle holder is provided along a side wall around the housing.

9. A wire harness comprising:
   a wiring member having conductivity; and
   an electrical connection box connected to the wiring member, wherein
   the electrical connection box includes:
   a housing that houses electronic components electrically connected with the wiring member; and
   a lower cover that closes a lower part of the housing,
   the housing includes an electric wire bundle holder whose lower side open so as to be able to allow insertion of at least one bonder cap of an electric wire bundle in which conductors of a plurality of electric wires are connected to each other in a state where the electric wire bundle is covered with the at least one bonder cap,
   the lower cover includes a deep bottom part having a drainage hole; and a shallow bottom part located above the deep bottom part below the electric wire bundle holder, the shallow bottom part being formed to include an inclined surface inclined downward toward the deep bottom part, and
   the inclined surface of the shallow bottom part on the lower cover abuts the electric wire bundle in a state where the at least one bonder cap is inserted into the electric wire bundle holder.

* * * * *